(12) United States Patent
Jones et al.

(10) Patent No.: US 7,036,073 B2
(45) Date of Patent: Apr. 25, 2006

(54) SYSTEM AND METHOD FOR SUPPORTING NON-NATIVE XML IN NATIVE XML OF A WORD-PROCESSOR DOCUMENT

(75) Inventors: Brian M. Jones, Redmond, WA (US); E. Mark Sunderland, Seattle, WA (US); Marcin Sawicki, Kirkland, WA (US); Robert A. Little, Redmond, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 10/184,560

(22) Filed: Jun. 27, 2002

(65) Prior Publication Data

US 2004/0205583 A1    Oct. 14, 2004

(51) Int. Cl.
*G06F 3/00* (2006.01)
(52) U.S. Cl. ....................................................... 715/517
(58) Field of Classification Search ................ 715/513, 715/517, 523, 530
See application file for complete search history.

(56) References Cited

U.S. PATENT DOCUMENTS

| | | | |
|---|---|---|---|
| 6,418,446 B1 | 7/2002 | Lection et al. | 707/103 R |
| 6,476,833 B1 | 11/2002 | Moshfeghi | 715/854 |
| 6,480,860 B1 | 11/2002 | Monday | 707/102 |
| 6,480,865 B1 | 11/2002 | Lee et al. | 715/523 |
| 6,487,566 B1 | 11/2002 | Sundaresan | 715/513 |
| 6,502,112 B1 | 12/2002 | Baisley | 715/513 |
| 2001/0054048 A1* | 12/2001 | Kelsey | 707/513 |
| 2003/0110279 A1* | 6/2003 | Banerjee et al. | 709/232 |
| 2003/0167445 A1* | 9/2003 | Su et al. | 715/513 |
| 2003/0188264 A1* | 10/2003 | Nawathe et al. | 715/513 |
| 2004/0205563 A1* | 10/2004 | Lee | 715/513 |
| 2004/0205573 A1* | 10/2004 | Carlson et al. | 715/513 |

OTHER PUBLICATIONS

Walsh, "Understanding XML Schemas," 1999, <http://www.xml.com/lpt/a/1999/07/schemas/index.html>, pp. 1-12.*
van der Vlist, "Comparing XML Schema Languages," Dec. 12, 2001, <http://www.xml.com/lpt/a/2001/12/12/schemacompare.html>, pp. 1-15.*
Ogbuji, "Validating XML with Schematron," Nov. 22, 2000, <http://www.xml.com/lpt/a/2000/11/22/schematron.html>, pp. 1-6.*
Hampton, "Web Content Validation with XML:: Schematron," Jan. 23, 2002, <http://www.xml.com/lpt/a/2002/01/23/perl-schematron.html>, pp. 1-7.*

(Continued)

*Primary Examiner*—Stephen Hong
*Assistant Examiner*—Kyle Stork
(74) *Attorney, Agent, or Firm*—Merchant & Gould P.C.; Joshua W. Korver

(57) ABSTRACT

A system and method for enabling validation of an extensible markup language (XML) document having elements associated with two or more schemata where elements of each schema may be arbitrarily nested within elements from the other schema and each set of elements remains valid within it's own schema. Elements of the second schema are transparent to the elements of the first schema when the word-processor validates the elements of the first schema. The elements of the second schema are separately validated, such that the elements of the first schema are transparent for the validation of the elements corresponding to the second schema.

23 Claims, 6 Drawing Sheets

OTHER PUBLICATIONS

Provost, "Beyond W3C XML Schema," Apr. 10, 2002, <http://www.xml.com/lpt/a/2002/04/10/beyondwxs.html>, pp. 1-6.*

"Topologi Announces Schematron Validator," Jun. 28, 2001, Cover Pages, <http://xml.coverpages.org/ni2001-06-28-b.html>, pp. 1-2.*

"Schematron: An Interview with Rick Jelliffe," Nov. 15, 1999, <http://www.xmlhack.com/read.php?item=121>, pp. 1-7.*

Thompson et al., "XML Schema Part 1: Structures," May 2, 2001, <http://www.w3.org/TR/2001/REC-xmlschema-1-20010502>, pp. 1-260.*

Shankar, Gess, "Able XML Pro Still Rough Around The Edges", *InfoWorld*, vol. 21, No. 33, (Sep. 6, 1999).

*Making XML Content Creation Easy* —www3.corel.com; 2002 Corel Corporation.

SoftQuad Software Inc. Announces XMetal. Latest XML/SGML Content Authoring Tool; No Author; 98-1117 Document Type—Business Wire Source of Article(s) —Newswire; Toronto, Canada (Business Wire) Nov. 17, 1998.

Alexander, George A. et al., "Page Layout and Composition Systems; Catalog Publishing Software", *Seybold Report on Publishing Systems*, vol. 29, No. 18, pp. 35, (Aug. 21, 2000).

Sloman, Greg, "XMLwriter", *Internet Magazine*, pp. 30 (May 1, 2000).

"Webwriter", *Internet Magazine*, pp. 131, (Feb. 1, 2000).

* cited by examiner

SYSTEM AND METHOD FOR SUPPORTING NON-NATIVE XML IN NATIVE XML OF A WORD-PROCESSOR DOCUMENT

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is commonly used to uniquely identify each XML document. Each XML document can use a namespace to allow processes to easily identify the type of XML associated with the document. The unique namespaces may also assist to differentiate markup elements that come from different sources and happen to have the same name.

XML Schemata provide a way to describe and validate data in an XML environment. A schema states what elements and attributes are used to describe content in an XML document, where each element is allowed, and which element can appear within other elements. The use of schemata ensures that the file is structured the same way. Schemata may be created by a user and generally supported by an associated markup language, such as XML. By using an XML editor that supports schema, the user can manipulate the XML file and generate XML documents that adhere to the schema the user has created.

XML documents may be created to adhere to one or more schemata. However, conventional mechanisms for validating elements within an XML document against more than one schema fall short of acceptable in certain situations.

If elements associated with a first schema are nested within elements of a second schema, any children of the nested elements cannot be validated against the first schema, unless both schemata are structured in such a way to account for each other. In other words, existing validation mechanisms can only validate an element and its children against a schema, but not its grandchildren directly. Often, the parent is the only one that can set the rules of it's children. If the child element is in a different schema, then the child element's schema must reference the parent's schema if the desire is to insert a grandchild in the parent's schema. There was no way to just originally say that the child's schema was transparent, and allow the parent to define what it's grandchild could be. Until now, this limitation has posed a problem for developers of markup language tools.

SUMMARY OF THE INVENTION

The present invention is directed at enabling validation of an extensible markup language (XML) document having elements associated with two or more schemata where elements of each schema may be arbitrarily nested within elements from the other schema and each set of elements remains valid within it's own schema. A word-processor has a first associated, or native schema that corresponds to a native XML. A document generated according to native XML may include arbitrary, or non-native XML elements nested within the native XML elements and native XML elements nested within non-native XML elements. The non-native XML elements are ignored by the word-processor when validating the native XML elements of the mixed XML file. The non-native XML elements are separately validated by utilizing a parallel XML tree generated from the non-native XML elements within the mixed XML file and treating the native XML elements as if they were transparent.

The present invention allows non-native XML elements that have their own related namespace, to be embedded within native XML elements that have another related namespace. Previously, users converted XML files to other formats for display or other functions. Previous XML editors did not acknowledge (i.e., invalidated) elements of a first namespace embedded within elements of a second namespace when being validated (unless both associated schemata explicitly allowed each other's namespace within themselves). The present invention provides for a native XML that allows other non-native XML elements to be embedded within native XML elements in the same XML file without regard to whether any of the XML schemas explicitly allowed embedded elements. Removing the native XML elements from the XML file would result in a document valid to the non-native XML schema having only the non-native XML. Correspondingly, removing the non-native XML elements from the XML files would result in a document valid to the native XML schema having only the native XML. Accordingly, the XML schema of one namespace is transparent to an XML schema of another namespace such that elements associated with each schema may be individually and separately validated.

For the transparency, the non-native XML elements are stored in a separate location referred to as a parallel XML tree as a document is built up from the mixed XML file. Each node of the tree corresponds to an element of the XML namespace in the mixed XML file. The nodes are mapped to the location of their corresponding element within the mixed XML file. Accordingly, when the XML file is stored, it retains both the non-native XML and native XML elements. An advantage of the XML tree is that it allows for treating the non-native XML as separate from the native XML for validation purposes against the non-native XML schema, while retaining the locations of the non-native XML within the native XML. Treating the native XML as transparent to the non-native XML allows the XML file to still be used and saved as a single file.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, markup elements may be associated with particular formatting that specifies how the content of the element is to be displayed or laid out. In other documents, the markup may be directed to describing data without addressing display considerations.

The terms "native markup language" or "native XML" refer to markup language elements that are associated with a word-processor application and a schema associated with the word-processor application.

The terms "non-native markup language" or "non-native XML" refer to markup language elements that a user or other application has created that adhere to schema different from the native XML schema.

The term "element" refers to the basic unit of an XML document. The element may contain attributes, other elements, content, and other building blocks for an XML document.

The term "tag" refers to a command inserted in a document that delineates elements within an XML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that is not included in the element's content.

Illustrative Operating Environment

Figure 1:
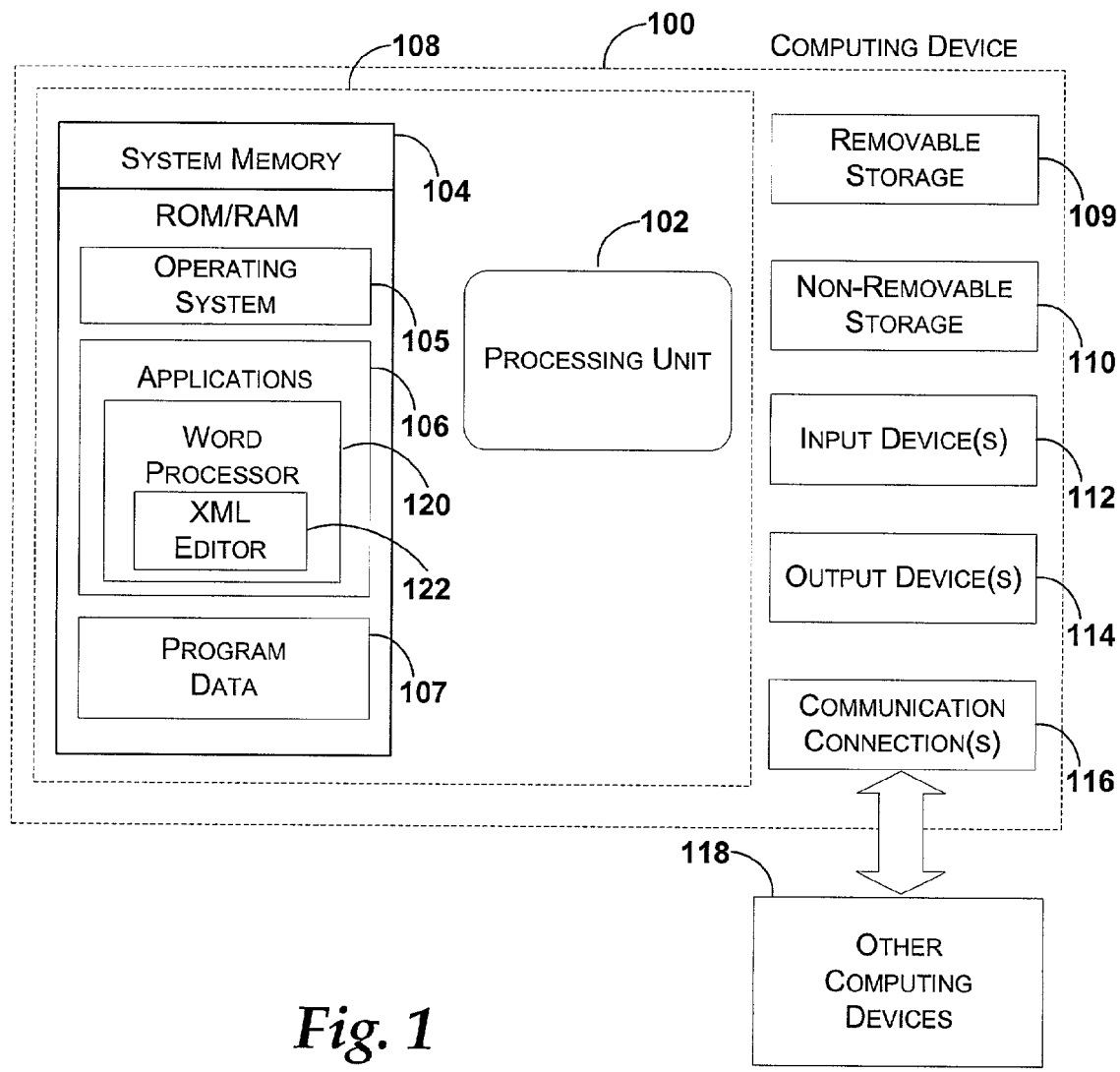
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes XML editor 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanisms, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Word-Processor File Structure

Figure 2:
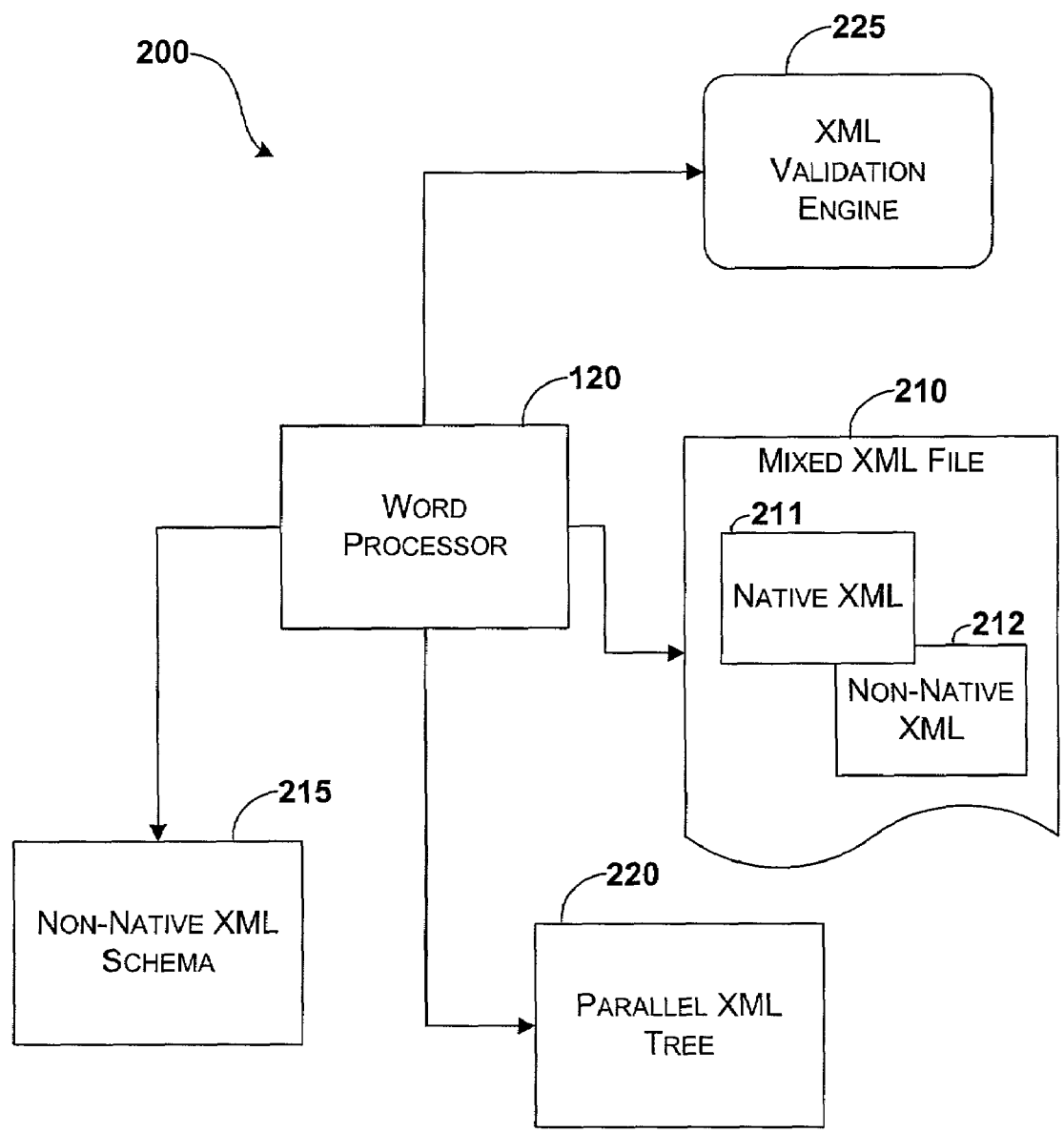
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, mixed XML file 210, non-native XML schema 215, parallel XML tree 220, and XML validation engine 225. Mixed XML file 210 includes both native XML 211 and non-native XML 212.

In one embodiment, word-processor 120 has its own namespace and a set of schemata that is defined for use with documents associated with word-processor 120. The set of tags and attributes defined by the schema for word-processor 120 may define the format of a document to such an extent that it is referred to as its own markup language, a native XML. The native XML is supported by word-processor 120 and may adhere to the rules of other markup languages while creating further rules of its own. A native XML provides a markup language that includes rich display information that a user can solicit without the need to spend time creating the schema corresponding to the display information.

Native XML 211 and non-native XML 212 are intermixed within mixed XML file 210. In accordance with the present invention, non-native XML 212 elements may be nested within native XML 211 elements, and native XML 211 elements may be nested within non-native XML 212 elements. Accordingly, when word-processor 120 internally validates the native XML 211 of mixed XML file 210, the internal validation process is confronted with the non-native XML 212 elements. An exemplary mixed XML file 210 is described in further detail in the discussion of FIG. 2 below.

Non-native XML schema 215 is associated with the non-native XML 212 elements. When validated, the non-native XML 212 elements are examined as to whether they conform to non-native XML schema 215. As previously described above, a schema states what tags and attributes are used to describe content in an XML document, where each tag is allowed, and which tags can appear within other tags, ensuring that the documentation is structured the same way. Accordingly, non-native XML 212 is valid when structured as set forth in non-native XML schema 215. Validation of non-native XML 212 is described further in the discussion of FIG. 5 below.

Before validation, the non-native XML 212 elements are stored in parallel XML tree 220. Parallel XML tree 220 is described further in the discussion of FIG. 4 below. Parallel XML tree 220 is presented to XML validation engine 225 to validate non-native XML 212. XML validation engine 225 operates similar to other available validation engines for XML documents. The XML validation engine 225 evaluates XML that is the in the structure of the non-native XML schema 215. In one embodiment, a greater number of validation engines may be associated with word-processor 120 for validating a greater number of markup language structures.

Figure 3:
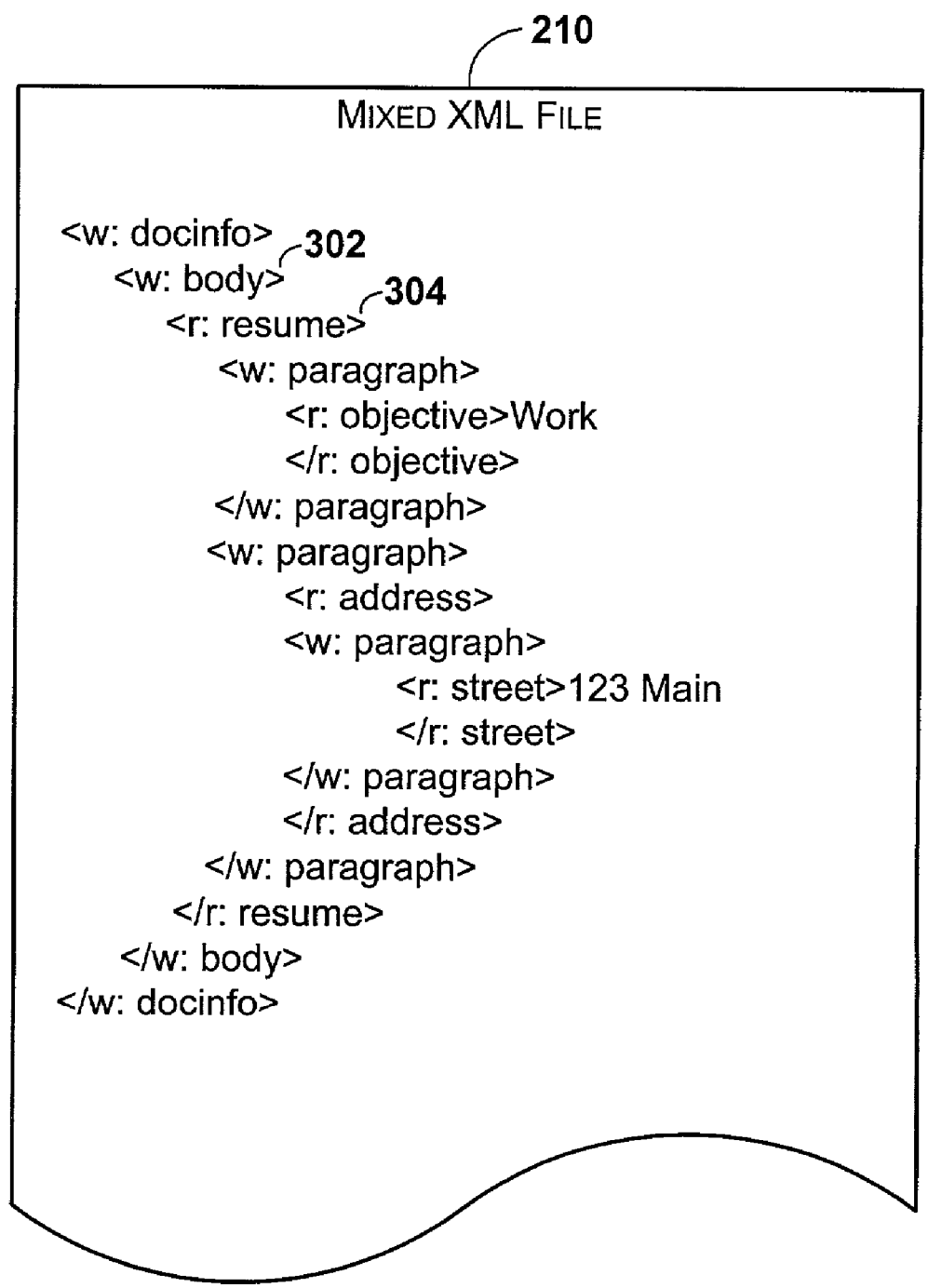
FIG. 3 illustrates an exemplary mixed XML file in accordance with the present invention.

FIG. 3 illustrates an exemplary mixed XML file in accordance with the present invention. Mixed XML file 210 includes both native XML elements and non-native XML elements. An element in a markup language usually includes an opening tag (indicated by a "21" and ">"), some content, and a closing tag (indicated by a "</" and ">"). The tags associated with native XML are referred to as being associated with the namespace of the word-processor (word-processor namespace). In contrast, the tags that are associated with non-native XML are referred to as being associated with a different namespace, in this example a "resume" namespace. The elements of mixed XML document 210 may further include content. For example, "Work" is contained within the "objective" element and "123 Main" is contained within the "street" element. The "street" element is included within the "address" element. These elements are defined according to a non-native XML schema corresponding to the resume namespace (e.g., a resume schema) that has been previously provided by the user or another application.

Examining mixed XML file 210, the file includes non-native XML elements nested within native XML elements, and native XML elements nested within non-native XML elements. Accordingly, when mixed XML file 210 is internally validated by a word-processor or forwarded as a tree to a validation engine, the application validating mixed XML file 210 is confronted with nested elements that correspond to two different schemata. Depending on the rules associated with validating application, mixed XML file 210 may be found invalid if the non-native XML schema does not allow for the native XML. For example, if mixed XML file 210 were forwarded to another XML validation engine in its entirety, the file would likely be found invalid. XML schemata typically do not allow elements of one namespace to be nested within elements of a second namespace. In one embodiment, the present invention overcomes this limitation by having a native XML schema associated with the word-processor that allows nesting of arbitrary elements associated with another non-native XML schema. An exemplary process for achieving a valid mixed XML file is described further in the discussions accompanying FIGS. 5 and 6.

Figure 4:
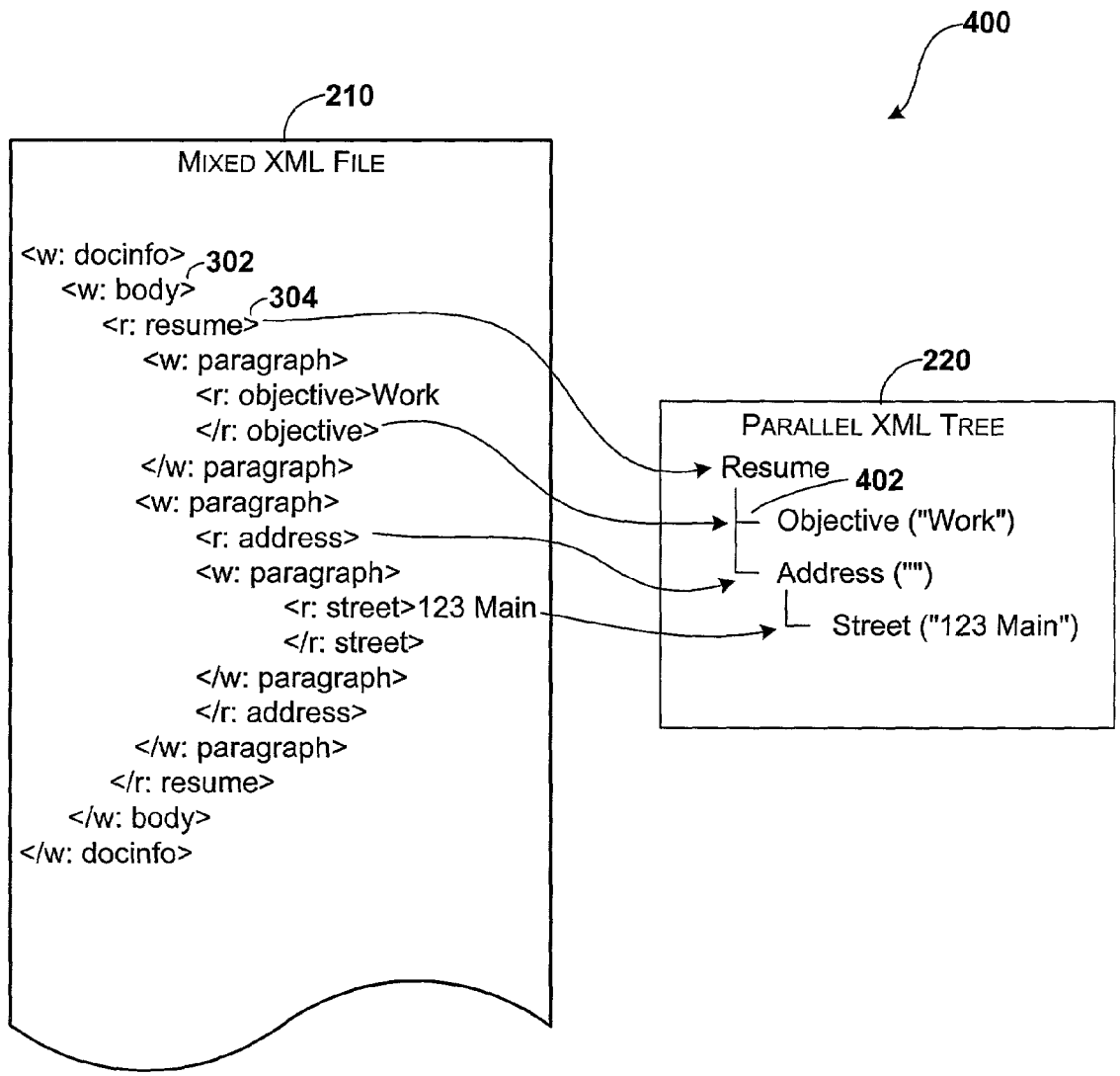
FIG. 4 shows an exemplary block diagram of the association between an exemplary mixed XML file and an exemplary parallel XML tree in accordance with the present invention.

FIG. 4 shows an exemplary block diagram of the association between an exemplary mixed XML file and an exemplary parallel XML tree in accordance with the present invention.

Parallel XML tree 220 is generated as word-processor 120 (shown in FIGS. 1 and 2) builds up a document while internally validating mixed XML file 210. The internal validation allows word-processor 120 to evaluate each element according to its own set of rules. When a non-native XML element is confronted nested within a native XML element, a node (e.g., 402) is generated within parallel XML tree 220 that corresponds to that element. The position of the node within parallel XML tree 220 is determined by the corresponding element's position within mixed XML document 210 relative to other elements. Accordingly, each non-native XML element of mixed XML file 210 is represented by a node (e.g., 402) of parallel XML tree 220. Direct parent-child relationships are established between the XML elements represented in the parallel XML tree 220, some of which may not have originally existed in mixed XML file 210 due to the intervening native XML markup. An exemplary process associated with generating the nodes for exemplary non-native XML tree 220 is described further in connection with FIG. 6. Parallel XML tree 220 allows word-processor 120 to essentially ignore the non-native XML elements as it internally validates mixed XML file 210. Parallel XML tree 220 can then be validated separately from mixed XML file 210 as described further in connection with FIG. 5 below.

Handling of Mixed XML File Elements

Figure 5:
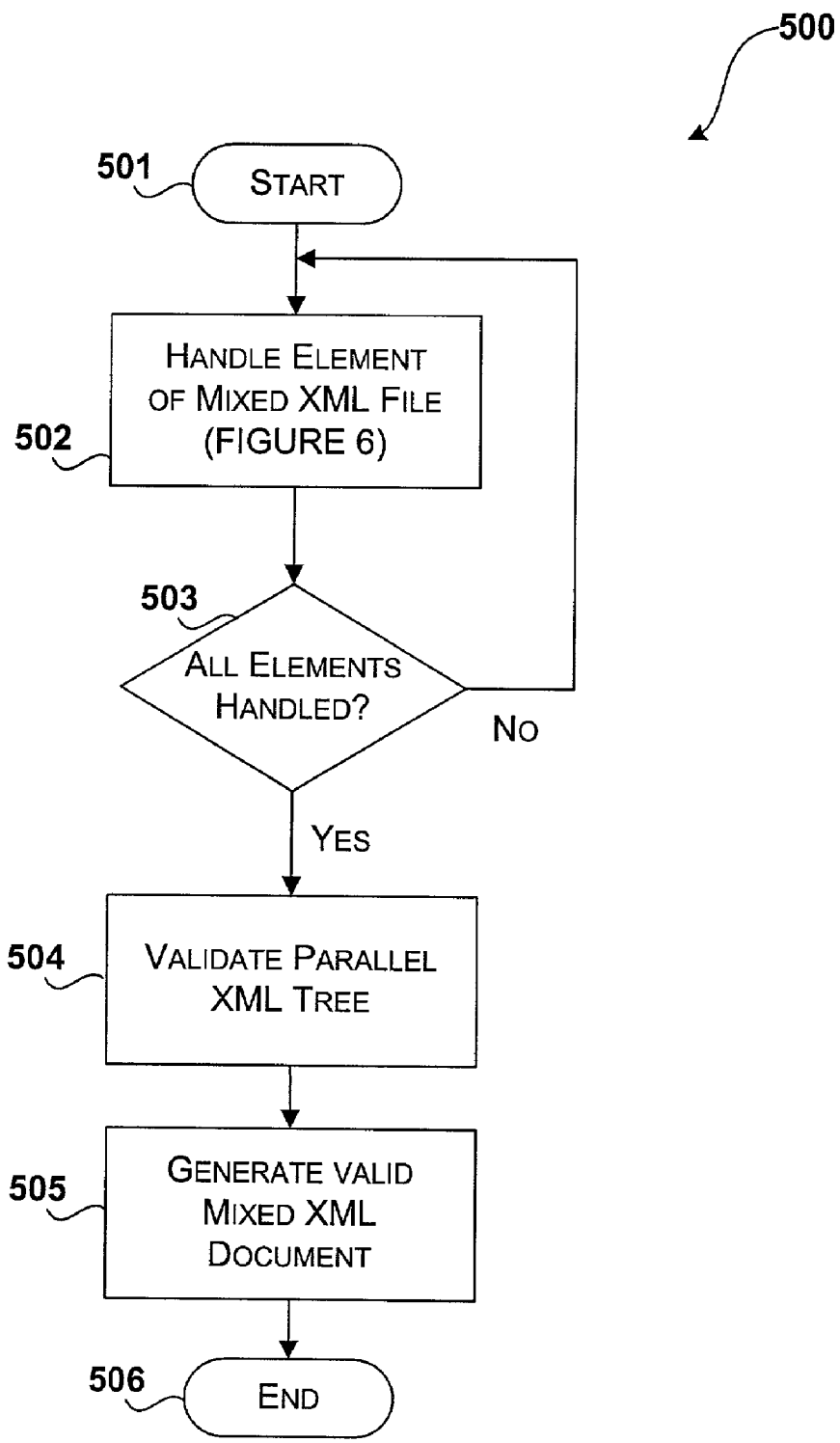
FIG. 5 is a logical flow diagram of an exemplary process for generating a mixed XML document in accordance with the present invention.

FIG. 5 is a logical flow diagram of an exemplary process for generating a mixed XML document in accordance with the present invention. The process 500 starts at block 501, where a mixed XML file has been previously generated by the user of a word-processor application similar to word-processor 120 shown in FIG. 1. Processing continues at block 502.

At block 502, an element of the mixed XML file is handled. In handling each element, a determination is made whether the element is a native XML element or a non-native XML element. How each element is handled depends on the type of element. When an element is a non-native XML element, a node corresponding to that element is inserted into the parallel XML tree, as further described in connection with FIG. 6. An exemplary process for handling each element is described further in connection with FIG. 6. Once the element is handled, the process moves to decision block 503.

At decision block 503, a determination is made whether each of the elements included in the mixed XML file has been handled. Each element has been handled when the word processor has reached the final closing tag of the mixed XML file when building up a document from the mixed XML file. If further elements have not yet been handled, processing returns to block 502 and begins handling a further element. If all elements have been handled, processing continues at block 504.

At block 504, the parallel XML tree is validated. The parallel XML tree is forwarded by the word-processor to an XML validation engine that is similar to XML validation engine 225 shown in FIG. 2. The XML validation engine operates to examine the parallel XML tree according to an associated schema that is similar to non-native XML schema 215 shown in FIG. 2. The associated schema states what tags and attributes are used to describe content in the resultant XML document, where each tag is allowed, and which elements can appear within other elements. The parallel XML tree is valid when it adheres to the associated schema. Once the parallel XML tree is validated, processing continues at block 505.

At block 505, the document corresponding to the mixed XML file is generated by the word-processor. In one embodiment, the document is formatted according to the native XML schema provided by the word-processor and displays the tags associated with non-native XML elements of the mixed XML file. Processing continues to block 506, where the process ends.

In one embodiment, process 500 may be altered as a result of internally validating the native XML or validating the non-native XML. For example, a determination may be made that either the native XML or the non-native XML is invalid. As a result, process 500 may be interrupted, an error message may be returned, a program may be launched to assist in correcting the XML, or further operations may be activated.

Figure 6:
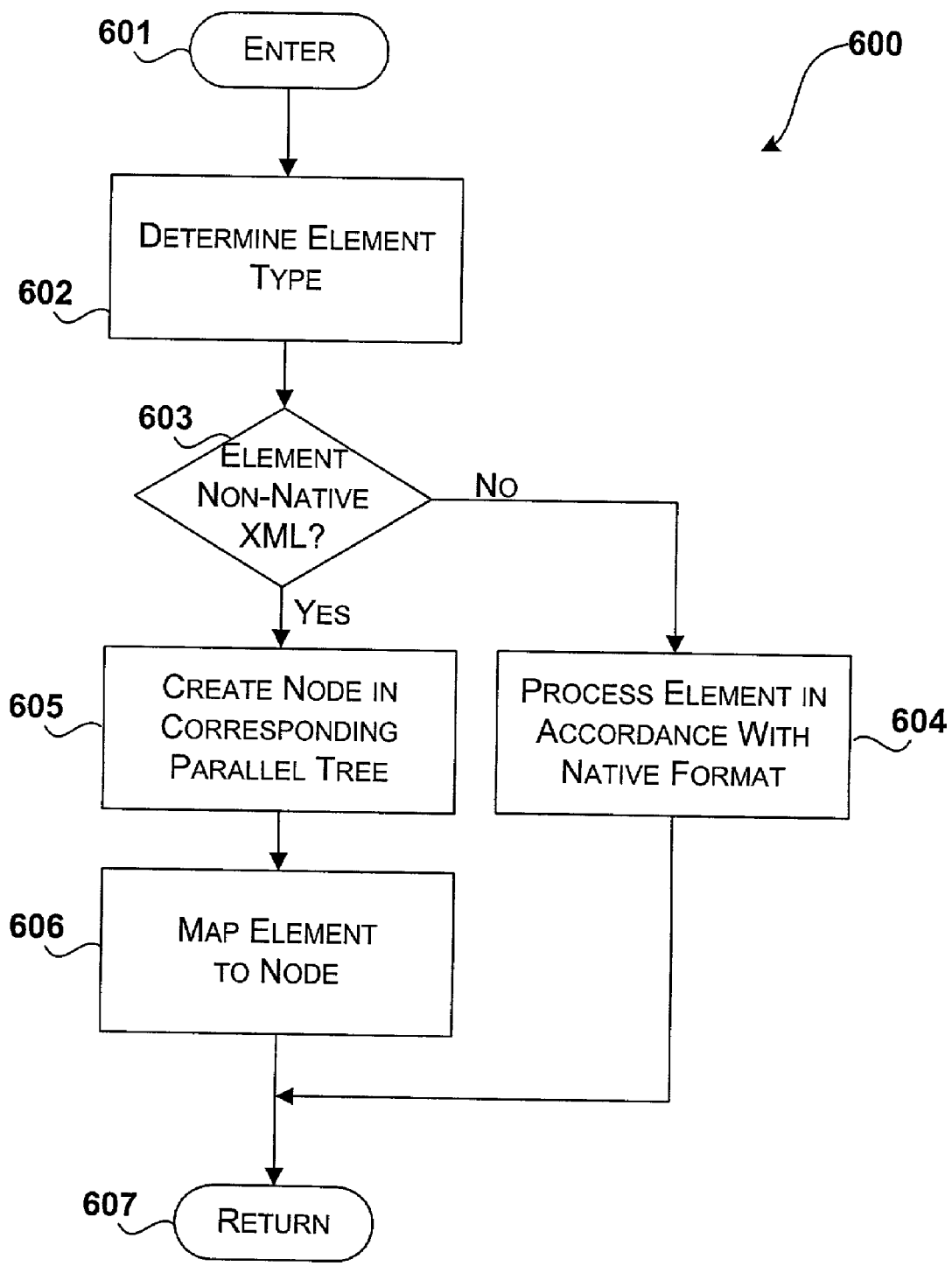
FIG. 6 is a logical flow diagram of an exemplary process for handling elements within a mixed XML document in accordance with the present invention.

FIG. 6 is a logical flow diagram of an exemplary process handling elements within a mixed XML document in accordance with the present invention. The process 600 enters at block 601 when process 500 shown in FIG. 5 enters block 502. Processing continues at block 602.

At block 602, a determination is made whether the element being handled corresponds to a native XML element or a non-native XML element. The type of element can be determined by examining the opening tag of each element. The opening tag of each element includes a reference to the schema that corresponds to that element (see FIG. 3). Each schema is associated with either native XML or non-native XML. Once the type of element is determined, the process moves to decision block 603.

At decision block 603, a determination is made whether the element is a non-native XML element. As previously stated, each element is handled differently according to the type of element. If the element is not a non-native XML element, processing continues at block 604.

At block 604, the element is processed in accordance with the native format of the word-processor (e.g., native XML). In one embodiment, the word processor provides its own internal validation for elements within its own format. In other words, the processor need not refer to an XML validation engine to validate elements corresponding to its native format (e.g., native XML). By recognizing elements of its native format as being valid or not, the word-processor may build up the document corresponding to these elements as the process continues. Once the native XML element is processed according to native XML, processing continues to block 607, where process returns to block 503 of FIG. 5.

If, however, the element is a non-native XML element, processing continues to block 605.

At block 605, a node that corresponds to the opening tag or attribute of the non-native XML element is created in a parallel XML tree. The parallel XML tree is examined for validity by an XML validation engine. The XML validation engine determines whether the parallel XML tree adheres to its associated non-native XML schema. By generating and separately validating the parallel XML tree, the present invention includes functionality for validating mixed XML documents having elements associated with two or more schemata where elements of each schema may be arbitrarily nested within each other. Once the node is created in the parallel tree, processing continues at block 606.

At block 606, the non-native XML element is mapped to the node created in the parallel tree. In one embodiment, a placeholder is associated with each element within the mixed XML file. The placeholder designates to each node the position of each non-native XML element within the mixed XML file. Mapping the non-native XML elements to their corresponding nodes allows the elements created and/or applied by the user to be positioned accurately within the resulting XML document. Once the non-native XML element is mapped to the node, processing continues to block 506, where process returns to block 503 of FIG. 5.

In one embodiment, multiple non-native XML schemata may be included in respective sections of the same mixed XML file. The parallel XML tree is generated with a node that corresponds to each element corresponding to each non-native XML schemata. In such a case, when the parallel XML tree is validated, the non-native XML elements corresponding to each schema are validated as if each respective section of the same mixed XML file were effectively separate XML files. However, if the multiple non-native XML schemata reference each other, it may result in the elements being inter-mixed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for supporting validation of an extensible markup language (XML) document that includes non-native XML within a native XML, the method comprising:
   determining whether an element in the XML document is associated with one of the non-native XML and the native XML;
   generating a parallel tree that includes nodes, wherein each node corresponds to the element of the markup language file associated with the non-native XML;
   validating the elements associated with the native XML in the XML document while ignoring the elements associated with the arbitrary markup language; and
   validating the parallel tree separately from the XML document, such that the elements associated with the native XML are transparent when validating the non-native XML.

2. The method of claim 1, wherein the method further comprises mapping each node to its corresponding element in the markup language file, such that the position of each element associated with the arbitrary markup language is stored.

3. The method of claim 1, wherein the method further comprises generating a markup language document that corresponds to the validated elements associated with the native XML and the validated elements associated with the non-native XML.

4. The method of claim 1, wherein the step of validating the elements associated with the native XML is executed internally by a word-processor.

5. The method of claim 4, wherein the word-processor determines the validity of the elements associated with the native XML such that the XML document is built as the word-processor evaluates each element.

6. The method of claim 1, wherein the step of validating the parallel tree separately from the XML document includes examining the parallel tree with a markup language validation engine according to a non-native XML schema that corresponds to the elements of the XML document that are associated with the non-native XML.

7. The method of claim 1, further comprising treating the elements associated with the non-native XML that are also associated with multiple different schemata, as separate files when validated.

8. A computer-readable medium having computer-executable components, comprising:
- a first component for generating an extensible markup language (XML) document that includes elements associated with a non-native XML nested within elements associated with a native XML of the word-processor;
- a second component for storing nodes, wherein each node is associated with each element associated with the non-native XML;
- a third component for validating the elements associated with the native XML in the first component while the elements associated with the non-native XML are transparent; and
- a fourth component for validating the second component separately from the first component, such that the elements associated with the native XML are transparent while the elements associated with the non-native XML are validated.

9. The computer-readable medium of claim 8, further comprising a fifth component for providing a schema that is associated with the non-native XML elements, wherein the non-native XML elements are validated against the fifth component.

10. The computer-readable medium of claim 8, wherein the second component is further arranged such that each node is mapped to its corresponding non-native XML element within the first component.

11. The computer-readable medium of claim 8, wherein the first component is further arranged such that a placeholder is associated with each non-native XML element when its corresponding node is generated in the second component.

12. The computer-readable medium of claim 8, wherein the first component further includes elements associated with the native XML nested within elements associated with the non-native XML.

13. A computer-readable medium encoded with a data structure, comprising:
- a first element that is associated with a native extensible markup language (XML) associated with a word-processor; and
- a second element that is associated with a non-native XML, wherein the second element is nested within the first element and the first element is transparent when the second element is validated and the second element is transparent when the first element is validated.

14. The computer-readable medium of claim 13, further comprising a third element that is associated with the native XML, wherein the third element is nested within the second element.

15. The computer-readable medium of claim 13, wherein the first element is validated separately from the second element.

16. The computer-readable medium of claim 13, wherein the first element is validated against a first schema associated with the native XML and the second element is validated against a second schema associated with the non-native XML.

17. The computer-readable medium of claim 13, wherein the first element is validated by the word-processor.

18. The computer-readable medium of claim 13, wherein the second element is validated by a non-native XML validation engine.

19. The computer-readable medium of claim 13, wherein the first and second elements form a valid XML document.

20. A computer-readable medium having computer-executable instructions for supporting validation of an extensible markup language (XML) document that includes non-native XML within native XML of a word-processor, the instructions comprising:
- determining whether an element in the XML document is associated with one of a first namespace and a second namespace, wherein the first namespace is associated with the native XML and the second namespace is associated with the non-native XML;
- generating a parallel tree that includes nodes, wherein each node corresponds the element of the XML document associated with the second namespace;
- mapping each node to its corresponding element in the markup language file, such that the position of each element associated with the second namespace is stored; and
- validating each element of the XML document such that elements associated with the first namespace are transparent when elements associated with the second namespace are validated, and the elements associated with the second namespace are transparent when elements associated with the first namespace are validated.

21. The computer-readable medium of claim 20, wherein the step of validating the elements associated with the first namespace is executed internally by the word-processor.

22. The computer-readable medium of claim 21, wherein the word-processor determines the validity of the elements associated with the first namespace such that the XML document is built as the word-processor evaluates each element.

23. The computer-readable medium of claim 20, wherein the step of validating the parallel tree separately from the XML file includes examining the parallel tree with an XML validation engine according to an non-native XML schema that corresponds to the elements of the XML file that are associated with the second namespace.

* * * * *

UNITED STATES PATENT AND TRADEMARK OFFICE
CERTIFICATE OF CORRECTION

PATENT NO. : 7,036,073 B2  Page 1 of 1
APPLICATION NO. : 10/184560
DATED : April 25, 2006
INVENTOR(S) : Brian M. Jones et al.

It is certified that error appears in the above-identified patent and that said Letters Patent is hereby corrected as shown below:

In column 5, line 33, delete ""21"" and insert -- "<" --; therefor.

Signed and Sealed this

Twenty-third Day of March, 2010

David J. Kappos
*Director of the United States Patent and Trademark Office*